(12) United States Patent
Blodgett, Jr.

(10) Patent No.: US 7,370,900 B1
(45) Date of Patent: May 13, 2008

(54) SYNCHRONIZER FOR SLIDE-OUT ROOM

(75) Inventor: Ray W. Blodgett, Jr., Norco, CA (US)

(73) Assignee: RBW Industries, Inc., Chino, CA (US)

( * ) Notice: Subject to any disclaimer, the term of this patent is extended or adjusted under 35 U.S.C. 154(b) by 44 days.

(21) Appl. No.: 10/957,018

(22) Filed: Oct. 1, 2004

Related U.S. Application Data

(60) Provisional application No. 60/508,456, filed on Oct. 3, 2003.

(51) Int. Cl.
*B60D 3/00* (2006.01)

(52) U.S. Cl. .................... 296/26.12; 296/171; 296/175; 296/26.13

(58) Field of Classification Search ................ 296/171, 296/172, 175, 176, 165, 181.7, 26.08, 26.09, 296/26.12, 26.13; 52/67
See application file for complete search history.

(56) References Cited

U.S. PATENT DOCUMENTS

| 5,248,180 | A | 9/1993 | Hussaini |
| 5,634,683 | A | 6/1997 | Young |
| 6,948,754 | B2 * | 9/2005 | Huffman et al. ......... 296/26.13 |
| 2005/0230989 | A1 | 10/2005 | Nebel |

* cited by examiner

*Primary Examiner*—Stephen Gordon
(74) *Attorney, Agent, or Firm*—Inskeep IP Group, Inc.

(57) ABSTRACT

The present invention provides a slide-out room synchronizing mechanism. In one preferred embodiment according to the present invention, the slide-out room synchronizer includes upper and lower timing belts fixed to the side of the slide-out room. Each belt is coupled to a synchronizing belt within the vehicle by a set of connecting gears. As the bottom of the slide-out room moves, the force is transferred through the gears and synchronizing belt to the top upper timing belts. In this respect, the movement of the top of the slide-out room is synchronized to the bottom, providing synchronized extension or retraction at equal or varying speeds.

6 Claims, 6 Drawing Sheets

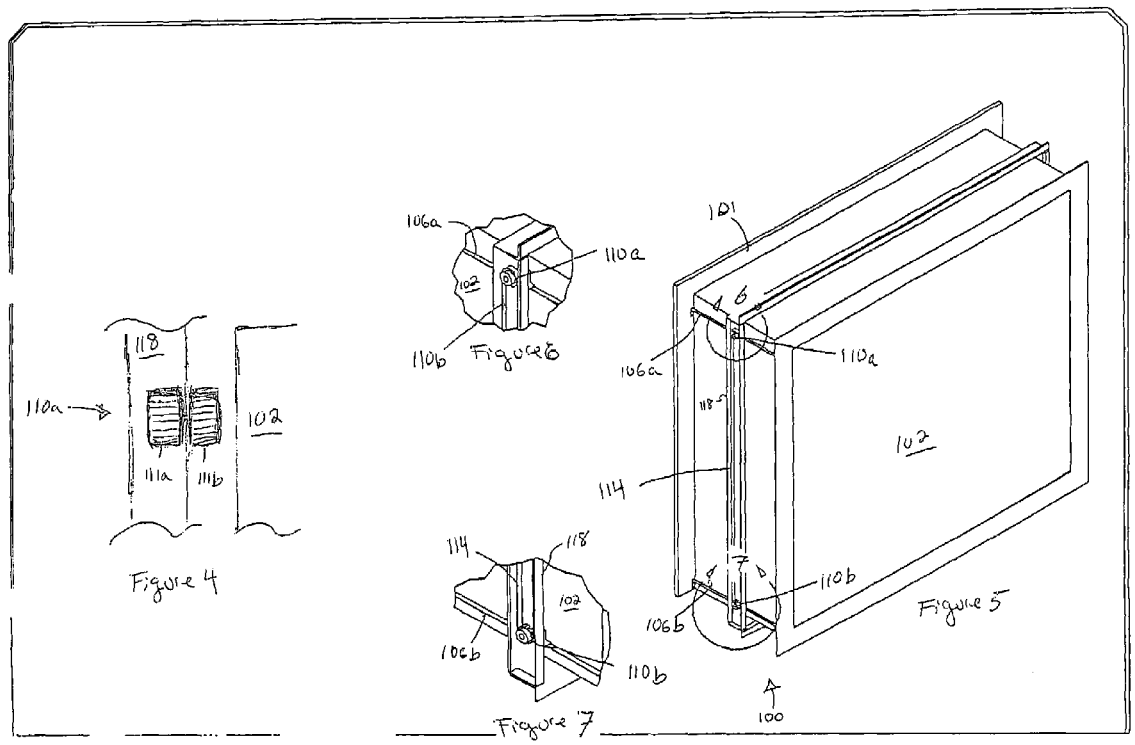

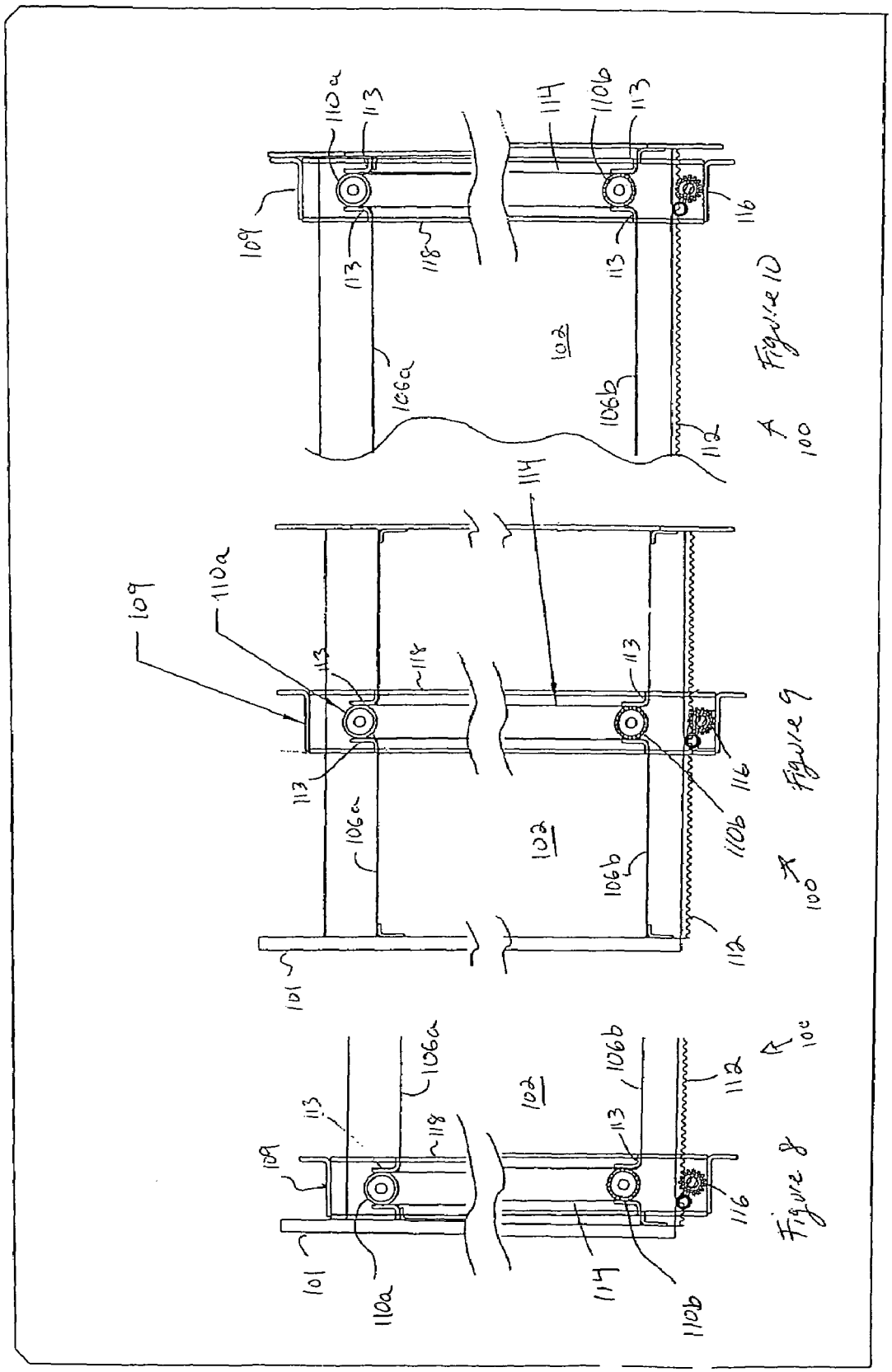

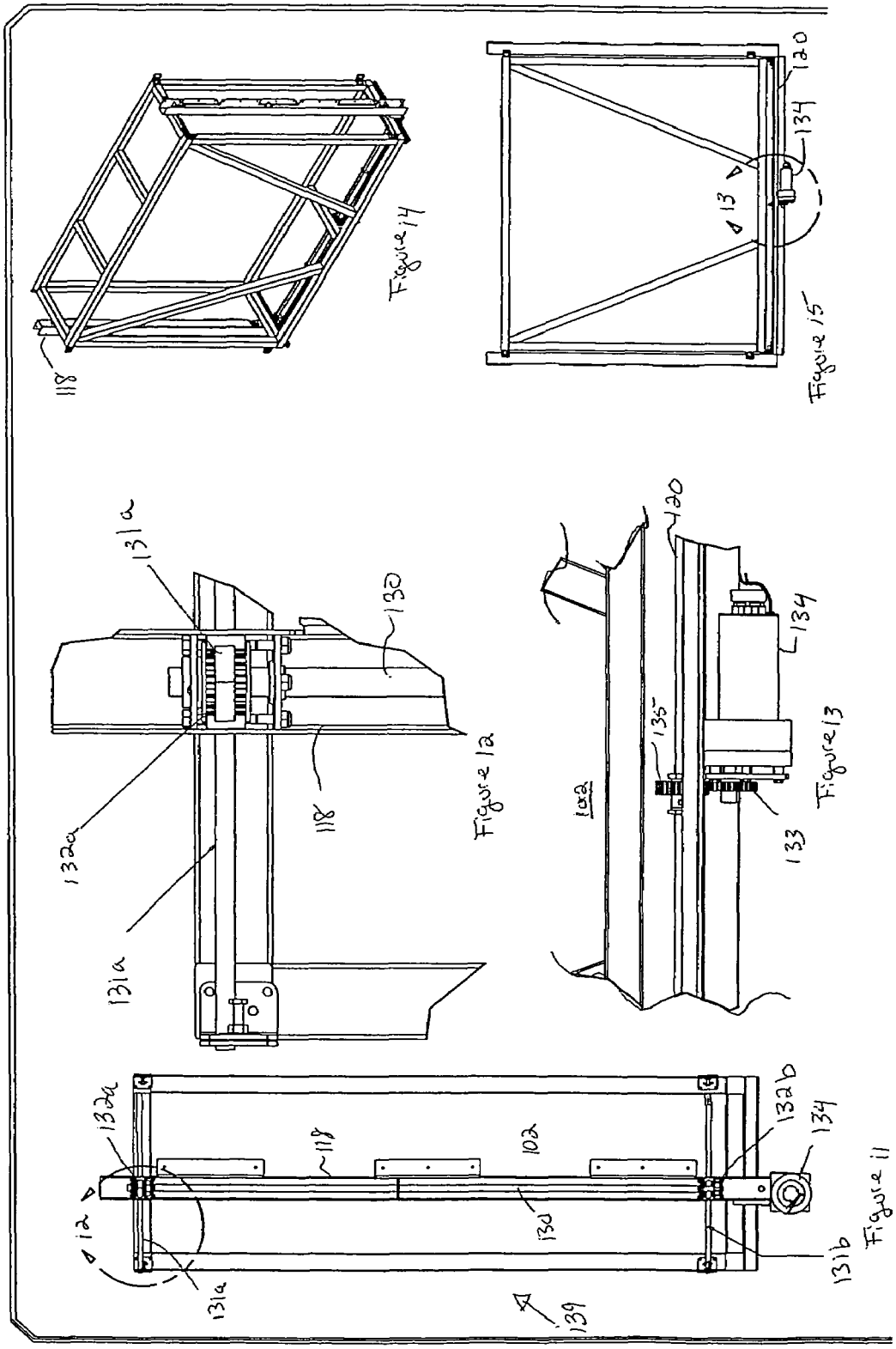

SYNCHRONIZER FOR SLIDE-OUT ROOM

CROSS REFERENCE TO RELATED APPLICATIONS

This application claims priority to U.S. Provisional Application 60/508,456, entitled Belt-Gear Above Floor Slide, filed Oct. 3, 2003 the entire contents of which are hereby incorporated by reference.

FIELD OF INVENTION

This invention relates broadly to slide-out rooms. More particularly, this invention relates to a mechanism for synchronizing movement of an upper and lower region of a slide-out room for a vehicle (motor home), travel trailer, fifth wheel travel trailer, and other recreational travel vehicles.

BACKGROUND OF THE INVENTION

In order to increase the available interior space of a motorized or towable vehicle such as a motor home or trailer, these vehicles have been designed to include slide-out rooms. When the vehicle is in transit, the slide-out room is retracted and stored in the vehicle's interior with the exterior wall of the slide-out room approximately flush with the vehicle's exterior. As a result, there is typically adequate space within the vehicle's interior to accommodate users in transit and remain within the standard width limitations imposed upon a vehicle. When the vehicle is parked and leveled, the slide-out room is then slid outward through an opening formed in a sidewall of the vehicle thereby, increasing the internal accommodations.

Typically, slide-out rooms include a floor section, a roof section, a first sidewall section, a second sidewall section, and a third sidewall section. In the retracted position, the roof section and the first and second sidewall section are concealed from exterior view, and the third sidewall section forms a portion of the vehicle's sidewall. At the same time, the floor section of the slide-out room typically rests above a floor section of a fixed room and may form a portion of the usable interior floor during vehicle transit. Similarly, the roof section of the slide-out room may define the interior ceiling of that part of the vehicle during transit. The proximal ends of the roof section, first sidewall section, and second sidewall section, include stop walls. As used herein, "proximal" refers to the portion towards the vehicle body and "distal" refers to the portion away from the vehicle body. The stop walls form an L-shaped configuration with the respective roof section, first sidewall section and second sidewall section. The stop walls engage the inner surface of a respective sidewall section of the fixed room when the slide-out room is fully extended, and thereby limit the travel of the slide-out room.

Many slide-out room designs include a manual or motorized mechanism for extending or retracting the slide-out room from a vehicle. For example, U.S. Patent Application 20040007890 entitled Room Expansion System, filed Jun. 25, 2003, and U.S. Pat. No. 5,833,296 entitled Motor-operated slide-out drive system with releasable brake, issued Nov. 10, 1998. The contents of each of these applications are hereby incorporated by reference. As seen in these example patents, the slide-out mechanism often includes a gear rack fixed beneath the slide-out room floor with at least one gear mounted to the vehicle and engaged with the gear rack. Thus, the gear rack and slide-out room are moved as the gear rotates either from a manual crank or a connected motor.

A significant benefit to this type of drive gearing is its simplicity. Moreover, heavy-duty gearing used in such a design typically increases the lifespan of the mechanism. Yet, with this type of gearing design most of the motive force is concentrated and exerted at the bottom of the room. This localized load on the bottom surface of the room can often create uneven slide-out conditions between the slide-out room's bottom portion (where the load is concentrated) and the top portion (where there is very little load).

Furthermore, due to the size of some slide-out rooms, the top of the slide-out room may be caused to move relative to bottom if pushed, bumped, or otherwise moved due to the "play" that exists in this type of gearing design. This "play" at the top of the slide-out room can intermittently unseal the slide-out room from the vehicle body when the slide-out room is in the closed position. Thus, dirt, water or other undesirable elements may enter the vehicle body thus making the vehicle interior unsightly or even causing damage.

At times, however, uneven extension or retraction of a slide-out room has been designed into the slide-out mechanism. For example, some prior art flush floor slide-out room designs extend and retract the slide-out room at varying angles to easily and efficiently extend to a flush position with the floor of the main vehicle body. However, it is preferable that the slide-out room retract to a substantially level position. More specifically, for practical reasons, the slide-out mechanism should preferably expand and retract the top and bottom of a slide-out room at different speeds, so as to achieve angled extension and retraction, yet totally retract to a substantially level position.

BRIEF SUMMARY OF THE INVENTION

Therefore, it is an object of the present invention to overcome the limitations of the prior art.

It is a further object of the present invention to provide a synchronizing mechanism for evenly sliding out a slide-out room of a vehicle.

It is yet a further object of the present invention to provide a mechanism that may unevenly extend or retract a slide-out room from a vehicle but synchronizing this uneven movement while it occurs.

It is yet a further object of the present invention to provide a synchronizing mechanism that secures the position of an upper area of a slide-out room, preventing the slide-out room from unsealing from the vehicle.

To achieve these and other objects not specifically enumerated here, the present invention provides a slide-out room synchronizing mechanism. In one preferred embodiment according to the present invention, the slide-out room synchronizer includes upper and lower timing belts fixed to the side of the slide-out room. Each belt is coupled to a synchronizing belt within the vehicle by way of a set of connecting gears. As the bottom of the slide-out room moves, the force is transferred through the gears and synchronizing belt to the top upper timing belts. The movement of the top of the slide-out room is then synchronized to the bottom, providing synchronized extension or retraction at equal or varying speeds.

BRIEF DESCRIPTION OF THE DRAWINGS

FIG. 4 illustrates a front view of a timing gear according to the present invention;

FIG. 5 illustrates a perspective view of the slide-out room and synchronizer of FIG. 2;

FIG. 6 illustrates a perspective view of an upper timing gear of FIG. 5;

FIG. 7 illustrates a perspective view of a lower timing gear of FIG. 6;

FIGS. 8-10 illustrate side views of the slide-out room and synchronizer of FIG. 2 in positions of expansion and retraction;

FIG. 11 illustrates a side view of a slide-out room and synchronizer according to the present invention;

FIG. 12 illustrates a side view of FIG. 11 at area 12;

FIG. 13 illustrates a front view of FIG. 15 at area 13;

FIG. 14 illustrates a perspective view of the synchronizer of FIG. 11;

FIG. 15 illustrates a front view of the synchronizer of FIG. 11;

DETAILED DESCRIPTION OF THE INVENTION

Figure 2:
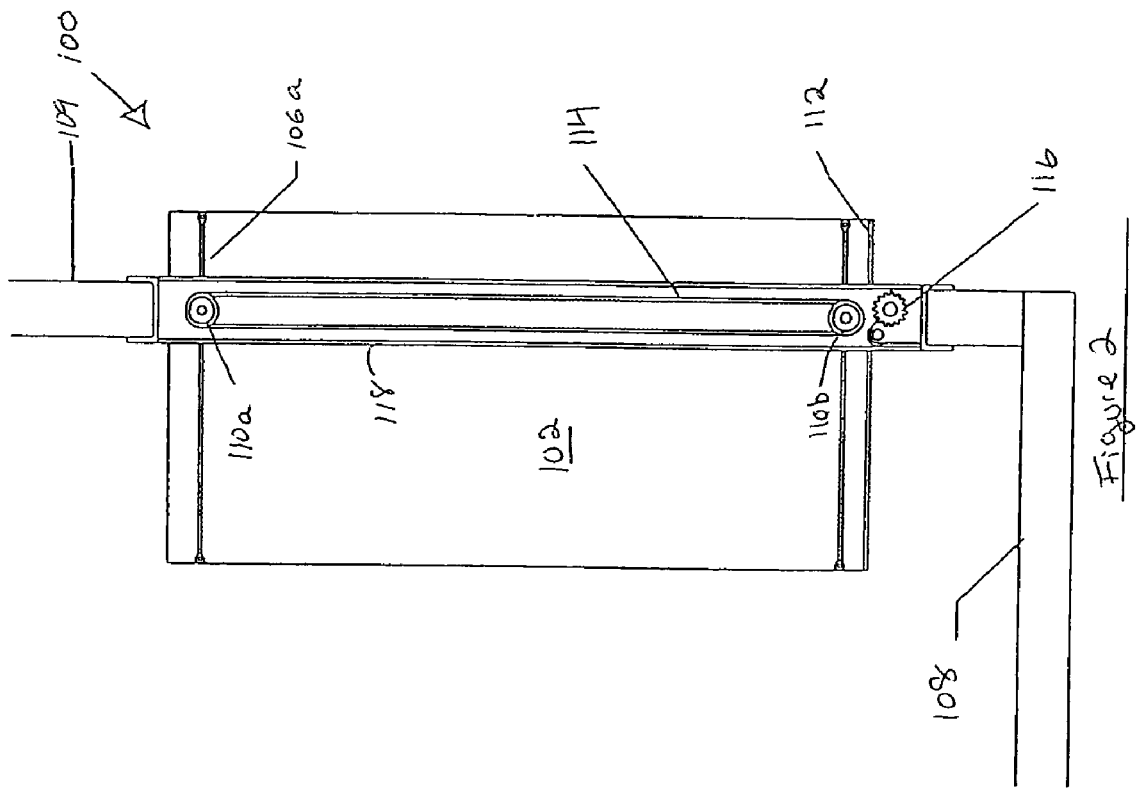
FIG. 2 illustrates a side view of the slide-out room of FIG. 1 with a synchronizer according to the present invention.

FIGS. 1-10 illustrate a preferred embodiment of a slide-out room synchronizer 100 according to the present invention. The slide-out room synchronizer 100 includes upper and lower timing belts 106a and 106b on each side of the slide-out room 102. The sidewall 118 of vehicle or trailer includes an upper and a lower timing gear 110a and 110b on each side that engage with the upper and lower timing belts 106a and 106b. The rotational movement of upper and lower timing gears 110a and 110b are synchronized by a synchronizing belt 114, which transfers any movement of the lower region of the slide-out room 102 to the upper region. Thus, the slide-out room synchronizer 100 synchronizes movement between the upper and lower regions of the slide-out room 102.

Figure 1:
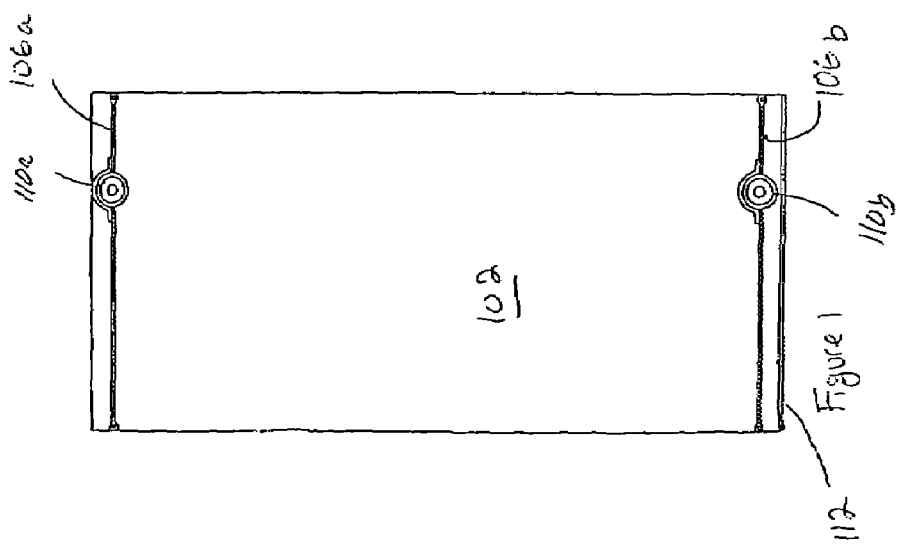
FIG. 1 illustrates a side view of a slide-out room according to the present invention.

Looking to FIGS. 1 and 2, a side view of the slide-out room 102 according to the present invention can be seen. Upper and lower timing belts 106a and 106b are fixed across the upper and lower sides of the slide-out room 102 respectively. Preferably, each timing belt 106a, 106b extends nearly the entire side of the slide-out room 102 and includes gear teeth or a similar engaging mechanism. In this respect, the timing belts 106a, 106b take a number of forms such as a toothed belt, chain, or any elongated engaging member.

The vehicle or trailer includes support around the slide-out room 102, such as an upper wall 109, a floor 108 and sidewalls 118. As best seen in FIG. 2, the sidewalls 118 contain the upper timing gear 110a, lower timing gear 110b, and synchronizing belt 114. The upper and lower timing gears 110a and 110b are rotatably mounted within the sidewall 118. As seen in FIGS. 4, 6 and 7, the timing gears 110a, 110b have an inner portion 111a and an outer portion 111b. The inner portion 111a engages the synchronizing belt 114 within the sidewall 118, while the outer portion 111b engages the timing belt 106a or 106b. Both of the timing belts 106a, 106b and the synchronizing belt 114 engage their respective gears with interlocking gear teeth or other known mechanical friction mechanisms. Note, for the sake of clarity, the timing belt 106a and the synchronizing belt 114 are not shown in FIG. 4.

As seen in FIGS. 8-10, the sidewall 118 includes timing belt guides 113 positioned adjacent the outer portion 111b of the timing gears 110a and 110b. The timing belt guides 113 hold the timing belt 106a or 106b against the timing gear 110a or 110b, preventing the timing belt 106a, 106b from slipping off of the timing gear 110a, 110b and losing synchronization.

Figure 3:
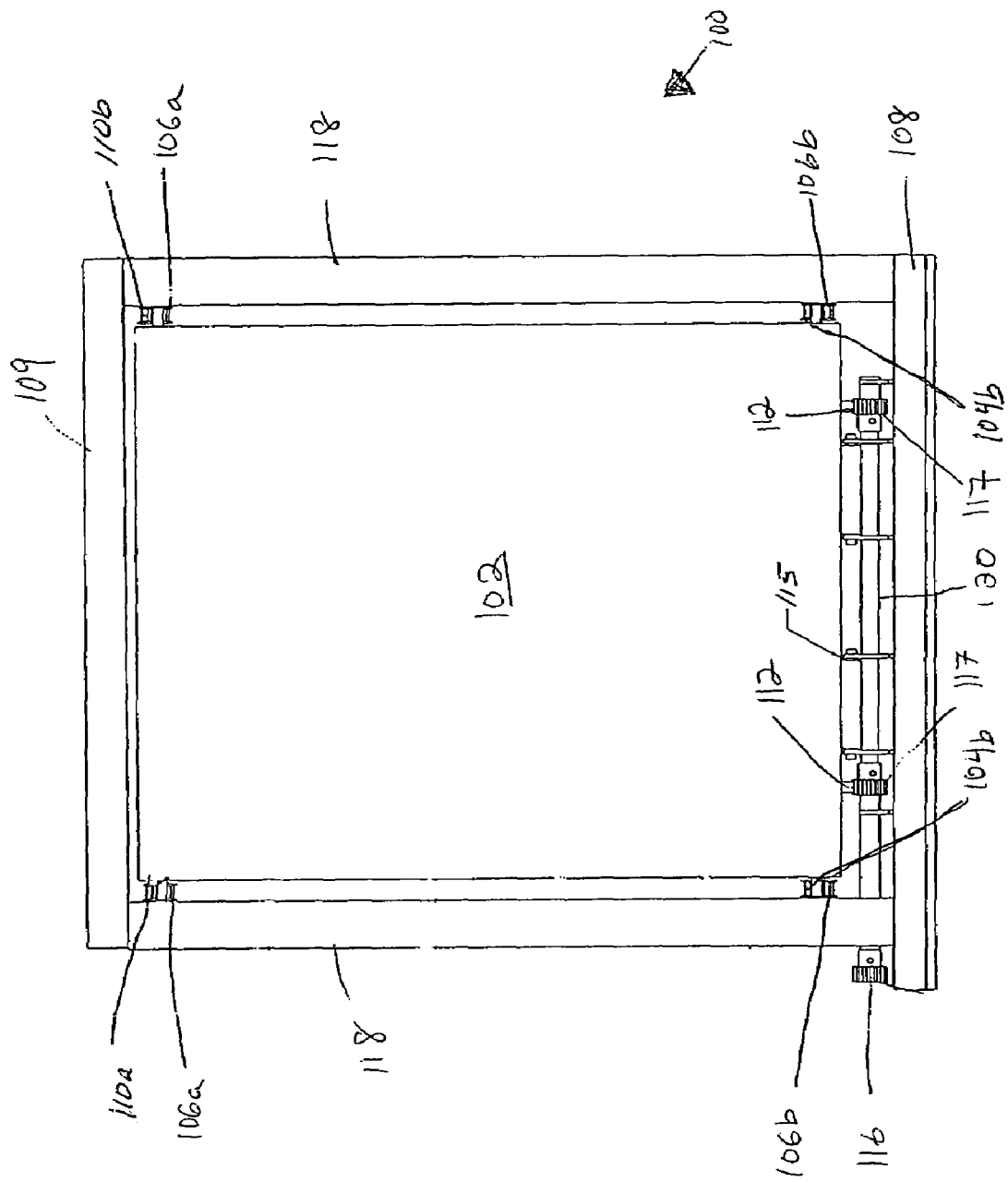
FIG. 3 illustrates a front view of the slide-out room and synchronizer of FIG. 2.

In the present preferred embodiment, the slide-out room 102 is driven by a drive shaft 120, seen in FIG. 3. The drive shaft 120 includes 2 geared portions 117 that engage two gear racks 112 fixed to the underside of the slide-out room 102. Rollers 115 press against the underside of the slide-out room for support and to reduce friction during extension or retraction. At one end of drive shaft 120 is motor gear 116, which is preferably coupled to a motor (not shown in this embodiment) or possibly a manual actuation device such as a crank (also not shown). Note that the slide-out room synchronizer 100 is not driven directly by the drive shaft 120. That is, the slide-out room synchronizer 100 is driven passively, not directly. In this regard, it is further noted that a mechanical drive mechanism is not necessary for the preferred embodiment of this invention, since a slide-out room may be simply pulled out of or pushed into vehicle body, and the synchronization mechanism still synchronizes the movement.

In operation, the drive shaft 120 is actuated by a motor or hand crank (not shown). The gears 117 of the drive shaft 120 push against the gear rack 112 underneath the slide-out room 102, moving the slide-out room 102 out from the vehicle or trailer. As the slide-out room 102 extends outward, lower timing belts 106b (i.e. the lower timing belts 106b on the left and right side of the slide-out room 102) move past the lower timing gears 110b, causing them to rotate. Since the rotating lower timing gears 110b are also coupled to the synchronizing belt 114, the synchronizing belt 114 is moved. The synchronizing belt 114, in turn, rotates the similarly coupled upper timing gear 110a which then moves along upper timing belt 106a. In this respect, differential force between the upper and lower vertical portions of the slide-out room 102 is transferred, providing a more uniform and even slide-out process. When a user wishes to retract the slide-out room 102, the motor or crank can be reversed and the synchronizer 100 operates as previously described, only in an opposite direction.

In another preferred embodiment, the synchronizer 100 may vary the size and number of gear teeth of the upper or lower timing gears 110a, 110b. This arrangement allows the slide-out room 102 to extend and retract the top at slower or faster speeds than the bottom, thus extending or retracting the slide-out room 102 at and angle. Such angled slide-out room 102 movement may be desired for creating tighter seals with the vehicle body or for a flush floor slide-out system.

In a similar respect, the number of teeth per length on the timing belt 106a, 106b can be varied between each other to produce a similar effect to the previously described embodiment. This will also allow the top of the slide-out room 102 to extend faster or slower than the bottom, moving the room 102 at and angle.

FIGS. 11-15 illustrate a another preferred embodiment according to the present invention. Unlike the previously described embodiment, however the second preferred embodiment includes a synchronizing rod 130 instead of a synchronizing belt. As best seen in FIG. 12, each end of the synchronizing rod 130 includes an upper timing gear 132a and lower timing gear 132b. The upper timing belt 131a partially encircles the upper timing gear 132a, (as shown in FIG. 12) engaging the timing gear 132a with matching gear teeth or other frictional engaging techniques. Similarly, the lower timing gear 132b is partially encircled by the lower timing belt 131b with matching gear teeth.

Additionally, the slide-out room synchronizer 139 includes a motor 134 positioned near the center of the drive shaft 120, as best seen in FIGS. 13 and 15. The drive shaft 120 includes a shaft gear 135 coupled to the drive gear 133. As with the previous embodiment the drive shaft 120 also includes this geared portions 117 that engage two gear racks 112 fixed to the under side of the slide out room 102 thus, as the motor 134 rotates the drive gear 133, the coupled shaft gear 135 also rotates, causing the drive shaft 120 and thus the geared portions 117 to drive the gear racks 112. This ultimately urges the slide out room 102 inward or outward.

The slide-out room synchronizer 139 functions similar to the previously described embodiment. As the motor 134 applies force to a lower portion of the slide-out room 102 for extension or retraction, the lower timing belt 131b and lower timing gear 132b cause the synchronizing shaft 130 to rotate. The synchronizing shaft 130 then rotates the upper timing gear 132a, moving the timing gear 132a against the upper timing belt 131a. In this respect, further horizontal force is transferred from the bottom of the room synchronizer 139 to the top as the slide-out room 102 extends or retracts and thus the same advantages described with the first embodiment are achieved.

Figure 17:
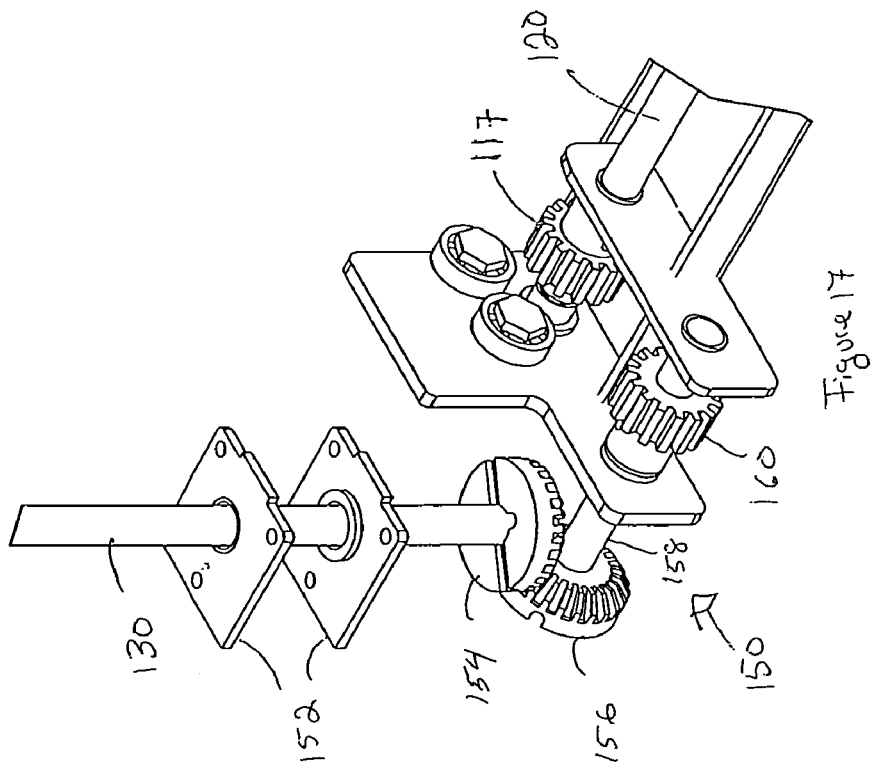
FIG. 17 illustrates a perspective view of FIG. 16 at area 17.
Figure 16:
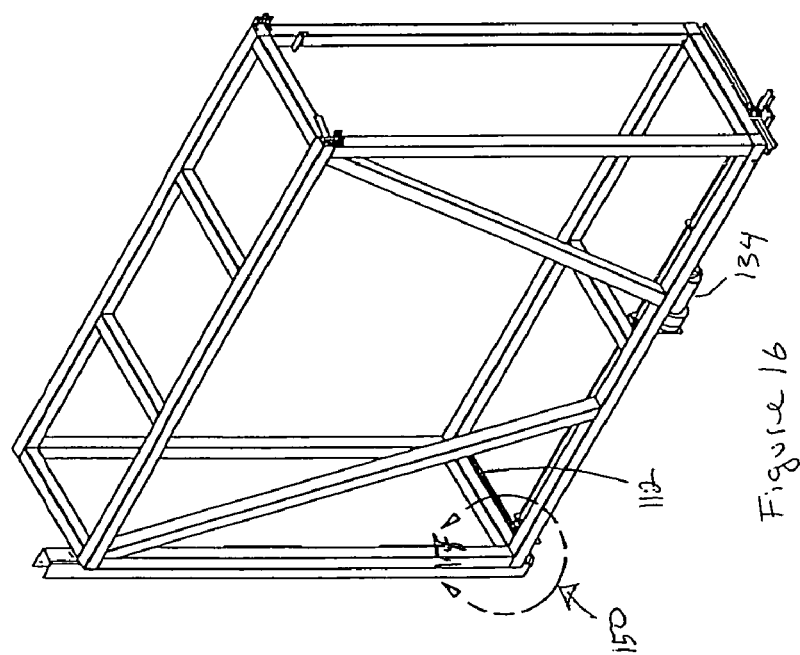
FIG. 16 illustrates a perspective view of a synchronizer according to the present invention.

FIGS. 16 and 17 illustrate another preferred embodiment according to the present invention including a gear-rack synchronization mechanism 150. It is similar to the embodiment described in FIGS. 11-15, however this next embodiment lacks a lower timing belt and timing gear. Instead, the synchronizing shaft 130 has a synchronizing miter gear 154 which couples to a timing miter gear 156. The timing miter gear 156 is fixed to a shaft 158 with timing gear 160 at the opposite end. The timing gear 160 is positioned to couple with the gear rack 112, sharing the gear rack 112 with geared portion 117 of the drive shaft 120.

As the motor 134 drives the expansion or retraction of the slide-out room 102 through the drive shaft 120, the timing gear 160 is caused to move by the gear rack 112, causing rotation of shaft 158. The rotating shaft 158, in turn, causes rotation of timing miter gear 156 and the coupled synchronizing miter gear 154. The synchronizing shaft 130 subsequently rotates, transferring horizontal force to the upper timing gear 132a and upper timing belt 131a similarly to the previous embodiment.

As with the previously described embodiments, the gear-rack synchronization mechanism 150 may be configured to extend or retract the slide-out room 102 at the same or different speeds, depending on the slide-out room design and the needs of the user. Additionally, the gear-rack synchronization mechanism 150 may be included at the top of the slide-out room 102 by adding additional gear racks to the slide-out room roof.

In yet another preferred embodiment, not shown in the Figures, the timing belts of the previously disclosed embodiments may instead be gear racks fixed to the sides or top and bottom of the slide-out room. The synchronizing mechanism (with either the synchronizing shaft or synchronizing belt) includes appropriate gears similar to those included in the previously describe embodiments to couple the synchronizing mechanism to the racks.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A method of moving a slide-out room comprising:
    providing a slide-out room on a vehicle;
    providing a drive mechanism connected to said vehicle and said slide-out room;
    providing a synchronizing mechanism disposed in said vehicle independent of said drive mechanism; said synchronizing mechanism engaged with a top region of said slide-out room and a bottom region of said slide-out room;
    directly driving said slide-out room into and out of a wall of said vehicle with said drive mechanism;
    passively synchronizing movement of said top region of said slide-out room with movement of said bottom region of said slide-out room with said synchronizing mechanism during said driving of said slide-out room into and out of said wall of said vehicle;
    wherein the passively synchronizing movement is movement resulting solely from movement of said slide-out room as said slide-out room is directly driven by said drive mechanism and not from any direct motive force of said drive mechanism on said synchronizing mechanism.

2. A method according to claim 1, wherein said top region and said bottom region are part of a side surface of said slide-out room.

3. A method according to claim 2, wherein said synchronizing mechanism comprises:
    a shaft rotatably disposed in said vehicle;
    a first synchronizing member disposed at said top region; and
    a second synchronizing member disposed at said bottom region.

4. A method according to claim 3, wherein said first synchronizing member and said second synchronizing member are horizontally fixed along said side surface of said slide-out room.

5. A method according to claim 4, wherein said first synchronizing member and said second synchronizing member are selected from a group consisting of a timing belt, a chain, a friction belt, a strap, a cable and a cord.

6. A method according to claim 5, wherein said step of passively synchronizing movement of said top region of said slide-out room with movement of said bottom region of said slide-out room further comprises:
    rotating said shaft with movement of said second synchronizing member relative to said shaft; and
    moving said first synchronizing member relative to said shaft by way of said rotation of said shaft.

* * * * *